(12) United States Patent
Gloeckner et al.

(10) Patent No.: US 6,794,482 B2
(45) Date of Patent: Sep. 21, 2004

(54) ADHESION PROMOTER ADDITIVE COMPRISING AN UNSATURATED, AMORPHOUS POLYESTER

(75) Inventors: Patrick Gloeckner, Ratingen (DE); Alessandro Cerri, Nottuln (DE); Werner Andrejewski, Dorsten (DE); Giselher Franzmann, Witten (DE); Peter Denkinger, Nottuln (DE)

(73) Assignee: Degussa AG, Duesseldorf (DE)

( * ) Notice: Subject to any disclaimer, the term of this patent is extended or adjusted under 35 U.S.C. 154(b) by 0 days.

(21) Appl. No.: 10/657,204

(22) Filed: Sep. 9, 2003

(65) Prior Publication Data
US 2004/0054075 A1 Mar. 18, 2004

(30) Foreign Application Priority Data
Sep. 12, 2002 (DE) .......................... 102 42 265

(51) Int. Cl.$^7$ ............................................. C08G 63/00
(52) U.S. Cl. .................... 528/271; 524/556; 524/601; 528/272
(58) Field of Search ................. 524/556, 601; 528/271, 272

(56) References Cited

U.S. PATENT DOCUMENTS 4,093,768 A * 6/1978 Cordts et al. ............ 428/301.1
4,122,074 A * 10/1978 Pepe et al. ................. 525/339

FOREIGN PATENT DOCUMENTS

| DE | 953 117 | 11/1956 |
|---|---|---|
| DE | 2 245 110 | 3/1974 |
| EP | 0 934 988 | 8/1999 |
| JP | 54-143494 | 11/1979 |
| WO | WO 89/07622 | 8/1989 |
| WO | WO 03/080703 | 10/2003 |

OTHER PUBLICATIONS

National Industrial Chemicals Notification and Assessment Scheme Full Public Report, pp. 1–10, XP–002239825, "Adhesion Resin BL 215 C", May 10, 1995.

* cited by examiner

Primary Examiner—Terressa M. Boykin
(74) Attorney, Agent, or Firm—Oblon, Spivak, McClelland, Maier & Neustadt, P.C.

(57) ABSTRACT

An adhesion promoter additive contains at least one unsaturated, amorphous polyester containing 1) an acid component comprising at least one α,β-unsaturated dicarboxylic acid, and 2) an alcohol component. The alcohol component contains at least 5% of a dicidol mixture of the isomeric compounds a) 3,8-bis(hydroxymethyl)tricyclo [5.2.1.0$^{2,6}$]decane, b) 4,8-bis(hydroxy-methyl)-tricyclo [5.2.1.0$^{2,6}$]decane and c) 5,8-bis-(hydroxymethyl)tricyclo [5.2.1.0$^{2,6}$]decane. Each isomer is present in the dicidol mixture in a proportion of from 20 to 40% by weight. A sum of the isomeric compounds a)–c) is from 90 to 100% by weight.

26 Claims, No Drawings

ADHESION PROMOTER ADDITIVE COMPRISING AN UNSATURATED, AMORPHOUS POLYESTER

BACKGROUND OF THE INVENTION

1. Field of the Invention

The present invention relates to an adhesion promoter additive comprising an unsaturated, amorphous polyester.

2. Discussion of the Background

Unsaturated polyester resins (UP resins) are well known. They are prepared by condensing saturated and unsaturated dicarboxylic acids or their anhydrides with diols. Their properties depend substantially on the nature and proportion of the starting materials.

The carrier of the polymerizable double bonds used are usually $\alpha,\beta$-unsaturated acids, primarily maleic acid and its anhydride or fumaric acid; unsaturated diols are of minor importance. The higher the amount of double bonds, i.e., the smaller the separation of the double bonds in the chain molecules, the more reactive the polyester resin. It polymerizes very rapidly with intense development of heat and extensive contraction to give a highly crosslinked and therefore comparatively brittle end product. For this reason, the reactive double bonds in the polyester molecule are "diluted" by co-condensing saturated aliphatic or aromatic dicarboxylic acids. The alcohol components used are straight-chain and/or branched diols. The individual UP resin types differ not only in the components used to prepare them but also in the ratio of saturated to unsaturated acids, which determines the crosslinking density in the polymerization, the degree of condensation, i.e., the molar mass, the acid number and the OH number, i.e., the type of end groups in the chain molecules, the monomer content, and the type of additives (Ullmann's Encyclopedia of Industrial Chemistry, Vol. A21, p. 217ff, 1992).

UP resins based on dicidol as the diol component are known, for example, from DE 924 889, DE 953 117, DE 22 45 110, DE 27 21 989, EP 114 208 and EP 934 988.

The use of unsaturated polyester resins to promote adhesion is known, for example, from DE 24 09 800, EP 114 208, and EP 934 988.

SUMMARY OF THE INVENTION

It is an object of the present invention to provide an adhesion promoter additive which enhances properties of coating materials, such as the adhesion of coating materials, and at the same time exhibits high corrosion protection, high hardness, improved gloss and solids content, and lower contraction in the case of crosslinked systems. This and other objects have been achieved by the present invention the first embodiment of which includes an adhesion promoter additive, comprising:

at least one unsaturated, amorphous polyester comprising
  1) an acid component comprising at least one $\alpha,\beta$-unsaturated dicarboxylic acid, and
  2) an alcohol component;

wherein said alcohol component comprises at least 5% of a dicidol mixture of the isomeric compounds
  a) 3,8-bis(hydroxymethyl)tricyclo[$5.2.1.0^{2,6}$]decane,
  b) 4,8-bis(hydroxy-methyl)tricyclo[$5.2.1.0^{2,6}$]decane, and
  c) 5,8-bis-(hydroxymethyl)tricyclo[$5.2.1.0^{2,6}$]decane;

wherein each isomer is present in said dicidol mixture in a proportion of from 20 to 40% by weight; and wherein a sum of said isomeric compounds a)–c) is from 90 to 100% by weight based on said dicidol mixture.

DETAILED DESCRIPTION OF THE INVENTION

The present invention provides an adhesion promoter additive comprising at least one unsaturated, amorphous polyester substantially comprising at least one $\alpha,\beta$-unsaturated dicarboxylic acid component and one alcohol component, wherein the alcohol component comprises a dicidol mixture of the isomeric compounds 3,8-bis (hydroxymethyl)tricyclo[$5.2.1.0^{2,6}$]decane, 4,8-bis (hydroxymethyl)tricyclo-[$5.2.1.0^{2,6}$]decane and 5,8-bis (hydroxymethyl)tricyclo[$5.2.1.0^{2,6}$]decane. Each isomer may be present in the mixture in a proportion of from 20 to 40% by weight and the sum of the three isomers is from 90 to 100% by weight, and at least 5% by weight of the mixture is present in the alcohol component of the polyester. The amount of each of the isomers includes all values and subvalues therebetween, especially including 22, 24, 26, 28, 30, 32, 34, 36 and 38% by weight.

The present invention also provides for the use of unsaturated, amorphous polyesters substantially comprising at least one $\alpha,\beta$-unsaturated dicarboxylic acid component and one alcohol component, wherein the alcohol component comprises a dicidol mixture of the isomeric compounds 3,8-bis(hydroxymethyl)tricyclo-[$5.2.1.0^{2,6}$]decane, 4,8-bis (hydroxymethyl)tricyclo[$5.2.1.0^{2,6}$]decane and 5,8-bis (hydroxymethyl)tricyclo[$5.2.1.0^{2,6}$]decane. Each isomer may be present in the mixture in a proportion of from 20 to 40% by weight and the sum of the three isomers is from 90 to 100% by weight, and at least 5% by weight of the mixture is present in the alcohol component of the polyester, as an adhesion promoter additive. The amount of each of the isomers includes all values and subvalues therebetween, especially including 22, 24, 26, 28, 30, 32, 34, 36 and 38% by weight.

It has been found that said additive is universally compatible with further ingredients of coating materials and/or adhesives and/or sealants. For example, the adhesion promoter additives may be mixed with polyacrylates, polyolefins, saturated and/or unsaturated polyesters and copolyesters, cellulose nitrate, phenol- and/or melamine-formaldehyde resins, phenolic resins, alkyd resins, acrylated polyesters, polyamides, phenol-formaldehyde resins and ketone-formaldehyde resins, ketone resins, polyurethanes, polyureas, epoxy resins, polyvinyl chloride and its derivatives, such as copolymers and terpolymers, polyvinyl alcohols, PVDF, polyethers, silicone resins, chlorinated rubber, cyclorubber, and cellulose acetobutyrate.

The adhesion promoter additives may be used, for example, as binders in filling compounds, where through oxidative drying or free-radical reaction they form corrosion-resistant layers. The good adhesion and the possibility of participating in crosslinking reactions predestine the resins according to the present invention for corrosion protection. In addition to increasing the adhesion, there is also an improvement in the intercoat adhesion to overlying and underlying, adjacent coats. A further advantage of the resins according to the present invention is their high stability to hydrolysis. Coating materials comprising an additive according to the present invention are also distinguished by high gloss and effective leveling.

In spray coating materials, moreover, there is a significant increase in over-spray absorption.

The adhesion promoter additives are used together with the above polymers in aqueous, solventborne (normal, medium, high, and very high solids) and/or solvent-free (powder and/or liquid) heat-curable, radiation-curable, airdrying (oxidatively and physically) coating materials, filling compounds and/or sealants, and adhesives, and are suitable as modifying resins for primers, surfacers, basecoats, single-coat topcoats, clearcoats, adhesives, sealants, traffic marking paints, and corrosion protection paints.

The adhesion promoter additives of the present invention comprising the unsaturated, amorphous polyester are described in greater detail below.

The unsaturated, amorphous polyester resins according to the present invention are obtained by reacting the alcohol component with the acid component.

According to the present invention, the alcohol component used is a dicidol mixture of the isomeric compounds 3,8-bis(hydroxymethyl)tricyclo[$5.2.1.0^{2,6}$]dacane, 4,8-bis(hydroxymethyl)tricyclo[$5.2.1.0^{2,6}$]decane and 5,8-bis(hydroxymethyl)tricyclo[$5.2.1.0^{2,6}$]decane. Each isomer may be present in the mixture in a proportion of from 20 to 40% by weight. The sum of the three isomers is from 90 to 100% by weight, preferably from 95 to 100% by weight. At least 5% by weight of the mixture is present in the alcohol component of the polyester. The isomer content of the dicidol mixture may be determined qualitatively and quantitatively, for example by GC analysis, or quantitatively by separating by means of preparative GC or HPLC and subsequent NMR spectroscopy. All corresponding isomers of dicidol in the 9-position are equally suitable but, owing to the mirror symmetry of the abovementioned isomers, like the cis- and trans-isomers, cannot be differentiated under conventional practical conditions.

The dicidol mixture may further comprise up to 10% by weight of further isomers of dicidol and/or trimeric and/or higher isomeric diols of the Diels-Alder reaction product of cyclopentadiene. The amount of isomers of dicidol and/or trimeric and/or higher isomeric diols of the Diels-Alder reaction product of cyclopentadiene includes all values and subvalues between 0 and 10% by weight, especially including 2, 4, 6 and 8% by weight. The alcohol component preferably contains 20–100% by weight, preferably 50–100%, more preferably 90–100% and most preferably 100% by weight of dicidol mixture which more preferably comprises from 95 to 100% by weight of the abovementioned three isomeric compounds. The amount of dicidol mixture includes all values and subvalues therebetween, especially including 25, 30, 35, 40, 45, 50, 55, 60, 65, 70, 75, 80, 85, 90 and 95% by weight. The amount of the three isomeric compounds in the dicidol mixture includes all values and subvalues therebetween, especially including 96, 97, 98 and 99% by weight.

In addition to the dicidol mixture, the alcohol component may comprise further linear and/or branched, aliphatic and/or cycloaliphatic and/or aromatic diols and/or polyols. The additional alcohols used are preferably ethylene glycol, 1,2- and/or 1,3-propanediol, diethylene glycol, dipropylene glycol, triethylene glycol or tetraethylene glycol, 1,2- and/or 1,4-butanediol, 1,3-butylethylpropanediol, 1,3-methylpropanediol, 1,5-pentanediol, cyclohexane dimethanol, glycerol, hexanediol, neopentyl glycol, trimethylolethane, trimethylolpropane and/or pentaerythritol and also bisphenol A, B, C, F, norbornylene glycol, 1,4-benzyldimethanol and 1,4-benzyldiethanol, and 2,4-dimethyl-2-ethylhexane-1,3-diol.

The starting acid component present in the unsaturated, amorphous polyester resins according to the present invention comprises at least one α,β-unsaturated dicarboxylic acid. The unsaturated polyester resins preferably comprise citraconic acid, fumaric acid, itaconic acid, maleic acid and/or mesaconic acid.

In addition, aromatic and/or aliphatic and/or cycloaliphatic monocarboxylic acids and/or dicarboxylic acids and/or polycarboxylic acids may also be present, for example phthalic acid, isophthalic acid, terephthalic acid, 1,4-cyclohexanedicarboxylic acid, succinic acid, sebacic acid, methyltetrahydrophthalic acid, methylhexahydrophthalic acid, hexahydrophthalic acid, tetrahydrophthalic acid, dodecanedioic acid, adipic acid, azelaic acid, isononanoic acid, 2-ethylhexanoic acid, pyromellitic acid and/or trimellitic acid. Preference is given to phthalic acid, hexahydrophthalic acid, tetrahydrophthalic acid, adipic acid and/or azelaic acid.

The acid component may partly or entirely consist of anhydrides and/or alkyl esters, preferably methyl esters.

In general, the alcohol component is present in a molar ratio of from 0.5:1 to 2.0:1 to the acid component, preferably from 0.8:1 to 1.5:1. The molar ratio of the alcohol component to the acid component includes all values and subvalues therebetween, especially including 0.6:1; 0.7:1; 0.8:1; 0.9:1; 1:1; 1.1:1; 1.2:1; 1.3:1; 1.4:1; 1.5:1; 1.6:1; 1.7:1; 1.8:1; and 1.9:1. The reaction of the alcohol component more preferably takes place in a molar ratio of from 1.0:1 to 1.1:1 to the acid component.

The unsaturated, amorphous polyesters according to the present invention may have an acid number of from 1 to 200 mg KOH/g, preferably from 1 to 100 mg KOH/g, more preferably from 1 to 50 mg KOH/g, and an OH number of from 1 to 200 mg KOH/g, preferably from 1 to 100 mg KOH/g, more preferably from 1 to 50 mg KOH/g. The acid number of the unsaturated amorphous polyester includes all values and subvalues therebetween, especially including 10, 20, 30, 40, 50, 60, 70, 80, 90, 100, 110, 120, 130, 140, 150, 160, 170, 180 and 190 mg KOH/g. The OH number includes all values and subvalues therebetween, especially including 10, 20, 30, 40, 50, 60, 70, 80, 90, 100, 110, 120, 130, 140, 150, 160, 170, 180 and 190 mg KOH/g. The Tg of the unsaturated, amorphous polyesters according to the invention varies from −30 to +80° C., preferably from −20 to +50° C., more preferably from −10 to +40° C. The Tg includes all values and subvalues therebetween, especially including −20, −10, 0, 10, 20, 30, 40, 50, 60 and 70° C.

In one preferred embodiment I, the saturated polyesters (UP resins) according to the present invention contain an alcohol component comprising at least 90%, preferably 95%, more preferably 100% by weight, of the dicidol mixture of the isomeric compounds 3,8-bis(hydroxymethyl)-tricyclo[$5.2.1.0^{2,6}$]decane, 4,8-bis(hydroxymethyl)tricyclo[$5.2.1.0^{2,6}$]decane and 5,8-bis(hydroxymethyl)tricyclo[$5.2.1.0^{2,6}$]decane, and of fumaric acid and/or maleic acid/anhydride. The amount of dicidol mixture in the alcohol component of the saturated polyester includes all values and subvalues therebetween, especially including 91, 92, 93, 94, 95, 96, 97, 98 and 99% by weight.

In a further preferred embodiment II, the polyesters comprise the abovementioned starting components as under I, but additionally a further acid selected from adipic acid and phthalic acid/anhydride, where the ratio of α,β-unsaturated acid to the additional acid may vary from 2:1 to 1:4. Preference is given to ratios of about 1:1 to 1:2. The ratio of α,β-unsaturated acid to the additional acid includes all values and subvalues therebetween, especially including 1.5:1; 1:1; 1:1.5; 1:2; 1:2.5; 1:3 and 1:3.5. These polyesters generally have acid numbers of from 1 to 200 mg KOH/g, preferably 1–100 mg KOH/g, more preferably 1–50 mg KOH/g, OH numbers of from 1 to 200 mg KOH/g, preferably 1–100 mg KOH/g, more preferably 1–50 mg KOH/g, and a Tg of from −30 to +80° C., preferably from −20 to +50° C., more preferably from −10 to +40° C. The acid number includes all values and subvalues therebetween, especially including 10, 20, 30, 40, 50, 60, 70, 80, 90, 100, 110, 120, 130, 140, 150, 160, 170, 180 and 190 mg KOH/g. The OH number includes all values and subvalues therebetween, especially including 10, 20, 30, 40, 50, 60, 70, 80, 90, 100, 110, 120, 130, 140, 150, 160, 170, 180 and 190 mg KOH/g. The Tg includes all values and subvalues therebetween, especially including −20, −10, 0, 10, 20, 30, 40, 50, 60 and 70° C.

The polyesters according to the present invention may also comprise assistants and additives which are selected from inhibitors, water and/or organic solvents, neutralizing agents, surface-active substances, oxygen scavengers and/or radical scavengers, catalysts, light stabilizers, color brighteners, photosensitizers, thixotropic agents, antiskinning agents, defoamers, antistats, thickening agents, thermoplastic additives, dyes, pigments, flame retardants, internal release agents, fillers and/or blowing agents.

The polyesters according to the present invention are prepared by continuous, semi-continuous or batchwise esterification and condensation of the starting acids and alcohols in a one-stage or two-stage procedure.

Having generally described this invention, a further understanding can be obtained by reference to certain specific examples which are provided herein for purposes of illustration only, and are not intended to be limiting unless otherwise specified.

EXAMPLES

Starting component: dicidol mixture (claim 1) in an isomer ratio of approximately 1:1:1

Example 1

Dodecanedioic acid and fumaric acid (ratio 0.6:0.4) were reacted with dicidol in a ratio of 1:1.05 at 180° C. in a nitrogen atmosphere until an acid number of 24 mg KOH/g and an OH number of 34 mg KOH/g were attained. To this end, the fumaric acid was initially esterified with dicidol over the course of one hour and then the dodecanedioic acid was added. $M_n$=2200 g/mol, $M_w$=5500 g/mol, glass transition temperature 4° C.

Example 2

Adipic acid and maleic acid (ratio 1:1) were reacted with dicidol in a ratio of 1:1.05 at 180° C. in a nitrogen atmosphere until an acid number of 26 mg KOH/g and an OH number of 37 mg KOH/g were attained. To this end, the maleic acid was initially esterified with dicidol over the course of one hour and then the adipic acid was added. $M_n$=1800 g/mol, $M_w$=4300 g/mol, glass transition temperature 12° C.

Application Example 1

In a red corrosion protection paint based on a soluble VC copolymer, 5% by weight of the binder was replaced by each of the resins according to the present invention from Examples 1 and 2, in the form of their 60% strength solutions in xylene. The original poor adhesion on zinked metal panels, measured as the characteristic cross-cut value "G5", was improved by the additives to reach the very good figures of in each case "G0".

| Formulations: | 1 | 2 | 3 |
|---|---|---|---|
| Vilit ® MB 30 | 13.4 | 13.1 | 13.1 |
| Hordaresin NP 70 | 9.2 | 9.0 | 9.0 |
| Vestinol ® AH | 4.1 | 4.0 | 4.0 |
| Araldit ® GY 250 | 0.5 | 0.5 | 0.5 |
| Butyl acetate | 2.0 | 2.0 | 2.0 |
| Xylene | 13.3 | 13.0 | 13.0 |
| Solvesso ® 100 | 12.6 | 12.2 | 12.2 |
| Adhesion resin from Example 1 - 60% in xylene | — | 2.2 | — |
| Adhesion resin from Example 2 - 60% in xylene | — | — | 2.2 |
| Thixotrol ® ST 10% in xylene | 9.2 | 9.0 | 9.0 |
| Perenol ® F 1 | 0.3 | 0.3 | 0.3 |
| Bayfferox ® 130 | 5.1 | 5.0 | 5.0 |
| Zinc oxide Harzsiegel S-NT | 2.3 | 2.3 | 2.3 |
| Blanc fixe N | 14.0 | 13.7 | 13.7 |
| Micro Talc AT 1 | 14.0 | 13.7 | 13.7 |
| SUM | 100.0 | 100.0 | 100.0 |

Substrate: zinked steel
Film thickness (dry): approx. 30 μm
Drying: 24 h, room temperature
Cross-cut value [Gt]:
Formulation 1: 5
Formulation 2: 0
Formulation 3: 0

Application Example 2

In a white corrosion protection paint based on chlorinated rubber, 5% by weight of the binder was replaced by each of the resins according to the invention from Examples 1 and 2, in the form of their 60% strength solutions in xylene. These additives improved the adhesion of such paints to unpretreated steel, zinked steel, and aluminum significantly.

| Formulations: | 1 | 2 | 3 |
|---|---|---|---|
| Pergut ® S 10 | 24.0 | 22.8 | 22.8 |
| Xylene | 43.2 | 42.1 | 42.1 |
| Vestinol ® AH | 7.6 | 7.2 | 7.2 |
| Edenol ® D 81 | 1.5 | 1.4 | 1.4 |
| TiO₂ Kronos ® 2059 | 23.7 | 23.7 | 23.7 |
| Adhesion resin from Example 1 - 60% in xylene | — | 2.8 | — |
| Adhesion resin from Example 2 - 60% in xylene | — | — | 2.8 |
| SUM | 100.0 | 100.0 | 100.0 |

Film thickness: 25–30 μm
Drying: 24 h, room temperature

| Substrate | Steel | Zinked steel | Aluminum |
|---|---|---|---|
| Formulation 1 | Gt5 | Gt3 | Gt5 |
| Formulation 2 | Gt0 | Gt0 | Gt0 |
| Formulation 3 | Gt0 | Gt0 | Gt0 |

Application Example 3

In a white baking varnish based on a hydroxyl-containing polyacrylate resin crosslinked with a fully methyl-etherified melamine resin, 5% by weight of the binder was replaced by each of the adhesion resins according to the invention from Examples 1 and 2, in the form of their 60% strength solutions in xylene. The moderate adhesion to zinked steel in the blank sample was significantly improved.

| Formulations: | 1 | 2 | 3 |
|---|---|---|---|
| Paraloid ® AT 410 | 43.0 | 40.5 | 40.5 |
| Cymel ® 303 | 8.2 | 7.8 | 7.8 |
| Methoxypropanol | 5.3 | 5.1 | 5.1 |
| Butanol | 2.1 | 2.0 | 2.0 |
| Dynapol ® Catalyst 1203 | 2.0 | 2.0 | 2.0 |
| TiO$_2$ Kronos ® 2059 | 39.4 | 39.4 | 39.4 |
| Adhesion resin from Example 1 - 60% in xylene | — | 3.2 | — |
| Adhesion resin from Example 2 - 60% in xylene | — | — | 3.2 |
| SUM | 100.0 | 100.0 | 100.0 |

Baking conditions: 30 min at 130° C.
Substrate: zinked steel
Film thickness (dry): 25–30 µm
Cross-cut value [Gt]:
Formulation 1: 2–3
Formulation 2: 0–1
Formulation 3: 0

Application Example 4

In a white baking varnish based on a hydroxyl-containing, saturated polyester resin crosslinked with a blocked polyisocyanate, 5% by weight of the binder was replaced by each of the adhesion resins according to the invention from Examples 1 and 2, in the form of their 60% strength solutions in xylene. The original moderate adhesion to zinked steel was greatly improved.

| Formulations: | 1 | 2 | 3 |
|---|---|---|---|
| Dynapol ® H 905-07 | 42.5 | 40.3 | 40.3 |
| VESTANAT ® B 1370 | 15.5 | 14.8 | 14.8 |
| DBTL, 10% in xylene | 1.0 | 1.0 | 1.0 |
| Xylene | 4.1 | 4.0 | 4.0 |
| Butyl acetate | 1.9 | 1.9 | 1.9 |
| TiO$_2$ Kronos ® 2059 | 35.0 | 35.0 | 35.0 |
| Adhesion resin from Example 1 - 60% in xylene | — | 3.0 | — |
| Adhesion resin from Example 2 - 60% in xylene | — | — | 3.0 |
| SUM | 100.0 | 100.0 | 100.0 |

Baking conditions: 15 min at 170° C.
Substrate: zinked steel
Film thickness (dry): 25–30 µm
Cross-cut value [Gt]:
Formulation 1: 2–3
Formulation 2: 0–1
Formulation 3: 0

German patent application 102 42 265.6, filed Sep. 12, 2002, is incorporated herein by reference.

Numerous modifications and variations on the present invention are possible in light of the above teachings. It is therefore to be understood that within the scope of the appended claims, the invention may be practiced otherwise than as specifically described herein.

What is claimed is:

1. An adhesion promoter additive, comprising:
at least one unsaturated, amorphous polyester comprising
1) an acid component comprising at least one α,β-unsaturated dicarboxylic acid compound, and
2) an alcohol component;
wherein said alcohol component comprises at least 5% of a dicidol mixture of the isomeric compounds
  a) 3,8-bis(hydroxymethyl)tricyclo[5.2.1.0$^{2,6}$]decane,
  b) 4,8-bis(hydroxy-methyl)tricyclo[5.2.1.0$^{2,6}$]decane, and
  c) 5,8-bis-(hydroxymethyl)tricyclo[5.2.1.0$^{2,6}$]decane;
wherein each isomer is present in said dicidol mixture in a proportion of from 20 to 40% by weight; and
wherein a sum of said isomeric compounds a)–c) is from 90 to 100% by weight based on said dicidol mixture.

2. The adhesion promoter additive as claimed in claim 1, wherein said dicidol mixture further comprises up to 10% by weight of an additional isomer selected from the group consisting of isomers of dicidol, isomers of trimeric diols of a Diels-Alder reaction product of cyclopentadiene, isomers of higher diols of the Diels-Alder reaction product of cyclopentadiene and mixtures thereof.

3. The adhesion promoter additive as claimed in claim 1, wherein said acid component further comprises a member selected from the group consisting of aromatic mono-carboxylic acids, aliphatic mono-carboxylic acids, cycloaliphatic mono-carboxylic acids, aromatic dicarboxylic acids, aliphatic dicarboxylic acids, cycloaliphatic dicarboxylic acids, aromatic polycarboxylic acids, aliphatic polycarboxylic acids, cycloaliphatic polycarboxylic acids and mixtures thereof.

4. The adhesion promoter additive as claimed in claim 1, wherein said acid component comprises partly or entirely anhydrides, alkyl esters or mixtures thereof.

5. The adhesion promoter additive as claimed in claim 1, wherein said alcohol component further comprises a member selected from the group consisting of linear diols, branched diols, aliphatic diols, cycloaliphatic diols, aromatic diols, linear polyols, branched polyols, aliphatic polyols, cycloaliphatic polyols, aromatic polyols and mixtures thereof.

6. The adhesion promoter additive as claimed in claim 1, wherein said α,β-unsaturated dicarboxylic acid compound is selected from the group consisting of citraconic acid, fumaric acid, itaconic acid, maleic acid, mesaconic acid and mixtures thereof.

7. The adhesion promoter additive as claimed in claim 1, further comprising an additional acid compound selected from the group consisting of phthalic acid, isophthalic acid, terephthalic acid, 1,4-cyclohexanedicarboxylic acid, succinic acid, sebacic acid, methyltetrahydrophthalic acid, methylhexahydrophthalic acid, hexahydrophthalic acid, tetrahydrophthalic acid, dodecanedioic acid, adipic acid, azelaic acid, pyromellitic acid, trimellitic acid, isononanoic acid and 2-ethylhexanoic acid, phthalic acid anhydride, isophthalic acid anhydride, terephthalic acid anhydride, 1,4-cyclohexanedicarboxylic acid anhydride, succinic acid anhydride, sebacic acid anhydride, methyltetrahydrophthalic acid anhydride, methylhexahydrophthalic acid anhydride, hexahydrophthalic acid anhydride, tetrahydrophthalic acid anhydride, dodecanedioic acid anhydride, adipic acid anhydride, azelaic acid anhydride, pyromellitic acid anhydride, trimellitic acid anhydride, phthalic acid methyl ester, isophthalic acid methyl ester, terephthalic acid methyl ester, 1,4-cyclohexanedicarboxylic acid methyl ester, succinic acid methyl ester, sebacic acid methyl ester, methyltetrahydrophthalic acid methyl ester, methylhexahydrophthalic acid methyl ester, hexahydrophthalic acid methyl ester, tetrahydrophthalic acid methyl ester, dodecanedioic acid methyl ester, adipic acid methyl ester, azelaic acid methyl ester, pyromellitic acid methyl ester, trimellitic acid methyl ester, and mixtures thereof.

8. The adhesion promoter additive as claimed in claim 1, further comprising an additional alcohol compound selected from the group consisting of ethylene glycol, 1,2-propanediol, 1,3-propanediol, diethylene glycol, dipropylene glycol, triethylene glycol, tetraethylene glycol, 1,2-butanediol, 1,4-butanediol, 1,3-butylethylpropanediol, 1,3-methylpropanediol, 1,5-pentanediol, cyclohexanedimethanol, glycerol, hexanediol, neopentyl glycol, trimethylolethane, trimethylolpropane, pentaerythritol, bisphenol A, bisphenol B, bisphenol C, bisphenol F, norbornylene glycol, 1,4-benzyldimethanol, 1,4-benzyldiethanol, 2,4-dimethyl-2-ethylhexane-1,3-diol and mixtures thereof.

9. The adhesion promoter additive as claimed in claim 2, wherein at least 20% by weight of said alcohol component comprises said dicidol mixture.

10. The adhesion promoter additive as claimed in claim 1, wherein at least 50% by weight of said alcohol component comprises said dicidol mixture.

11. The adhesion promoter additive as claimed in claim 1, wherein at least 90% by weight of said alcohol component comprises said dicidol mixture.

12. The adhesion promoter additive as claimed in claim 1, wherein 100% by weight of said alcohol component comprises said dicidol mixture.

13. The adhesion promoter additive as claimed in claim 1, wherein said α,β-unsaturated dicarboxylic acid compound is fumaric acid, maleic acid, maleic anhydride or mixtures thereof.

14. The adhesion promoter additive as claimed in claim 1, wherein said acid component comprises adipic acid, phthalic acid, phthalic anhydride or mixtures thereof.

15. The adhesion promoter additive as claimed in claim 1, wherein a molar ratio of said alcohol component to said acid component is from 0.5:1 to 2.0:1.

16. The adhesion promoter additive as claimed in claim 1, wherein a molar ratio of said alcohol component to said acid component is from 0.8:1 to 1.5:1.

17. The adhesion promoter additive as claimed in claim 1, wherein wherein a molar ratio of said alcohol component to said acid component is from 1.0:1 to 1.1:1.

18. The adhesion promoter additive as claimed in claim 1, which has an acid number of from 1 to 200 mg KOH/g.

19. The adhesion promoter additive as claimed in claim 1, which has an OH number of from 1 to 200 mg KOH/g.

20. The adhesion promoter additive as claimed in claim 1, further comprising assistants, additives or mixtures thereof.

21. The adhesion promoter additive as claimed in claim 20, wherein said assistants and additives are selected from the group consisting of inhibitors, water, organic solvents, neutralizing agents, surface-active substances, oxygen scavengers, radical scavengers, catalysts, light stabilizers, color brighteners, photosensitizers, thixotropic agents, anti-skinning agents, defoamers, antistatic agents, thickening agents, thermoplastic additives, dyes, pigments, flame retardants, internal release agents, fillers, blowing agents and mixtures thereof.

22. The adhesion promoter additive as claimed in claim 2, wherein said alcohol component comprises at least 90% of said dicidol mixture, and
   wherein fumaric acid, maleic acid maleic anhydride or mixtures thereof are present in a diol/acid ratio of from 0.9:1 to 1.1:1.

23. The adhesion promoter additive as claimed in claim 1, wherein said acid component further comprises as additional acid adipic acid, phthalic acid phthalic anhydride and mixtures thereof in a ratio of α,β-unsaturated acid to additional acid of from 3:1 to 1:4.

24. A coating composition, comprising:
   the adhesion promoter additive according to claim 1; and
   optionally water, an organic solvent or mixtures thereof.

25. The coating composition as claimed in claim 24, which is selected from the group consisting of paints, varnishes, glazes, traffic markings, filling compounds, and pigment pastes.

26. The coating composition as claimed in claim 24, which is a primer, a surfacer, a basecoat, a topcoat, or a clearcoat.

* * * * *